United States Patent [19]

Chonan et al.

[11] Patent Number: 5,056,482
[45] Date of Patent: Oct. 15, 1991

[54] ENGINE PROTECTING SYSTEM

[75] Inventors: Misugi Chonan, Tokyo; Yoshiki Yuzuriha, Isesaki, both of Japan

[73] Assignees: Fuji Heavy Industries Ltd., Tokyo; Japan Electronic Control Systems Co., Ltd., Isesaki, both of Japan

[21] Appl. No.: 603,404

[22] Filed: Oct. 26, 1990

[30] Foreign Application Priority Data

Dec. 1, 1989 [JP] Japan .................. 1-138638

[51] Int. Cl.⁵ .............. F02D 17/04; F02D 41/22; F02B 77/08
[52] U.S. Cl. ..................... 123/331; 123/333; 123/335; 123/198; 74/866; 74/868; 364/424.1
[58] Field of Search .............. 123/330, 331, 332, 333, 123/334, 335, 198 D, 198 DB, 198 DC; 74/843, 859, 866, 868; 364/424.1

[56] References Cited

U.S. PATENT DOCUMENTS

| 3,983,859 | 10/1976 | Pritchard | 123/198 DC |
| 4,336,778 | 6/1982 | Howard | 123/198 D X |
| 4,449,495 | 5/1984 | Fiala | 123/198 DC X |
| 4,515,040 | 5/1985 | Takeuchi et al. | 74/859 X |
| 4,619,231 | 10/1986 | Stolar et al. | 123/198 D X |
| 4,771,656 | 9/1988 | Itoh et al. | 74/859 X |
| 4,856,471 | 8/1989 | Pettinelli | 123/198 D |
| 4,916,982 | 4/1990 | Suzuki | 74/868 X |
| 4,945,484 | 7/1990 | Cote et al. | 74/866 X |
| 4,955,258 | 9/1990 | Ito et al. | 74/866 |

FOREIGN PATENT DOCUMENTS

| 0012450 | 6/1980 | European Pat. Off. | 123/330 |
| 0229041 | 12/1984 | Japan | 123/330 |

Primary Examiner—Willis R. Wolfe
Attorney, Agent, or Firm—Foley & Lardner

[57] ABSTRACT

Disclsoed is a system of protecting an engine of the type where a driving power is transmitted through a variable reduction gear ratio belt, in which when breaking of the belt is detected, control of stopping the engine is performed, or control of excessively enriching the air-fuel ratio of an air-fuel mixture supplied to the engine is performed and then, control of stopping the engine is performed.

11 Claims, 7 Drawing Sheets

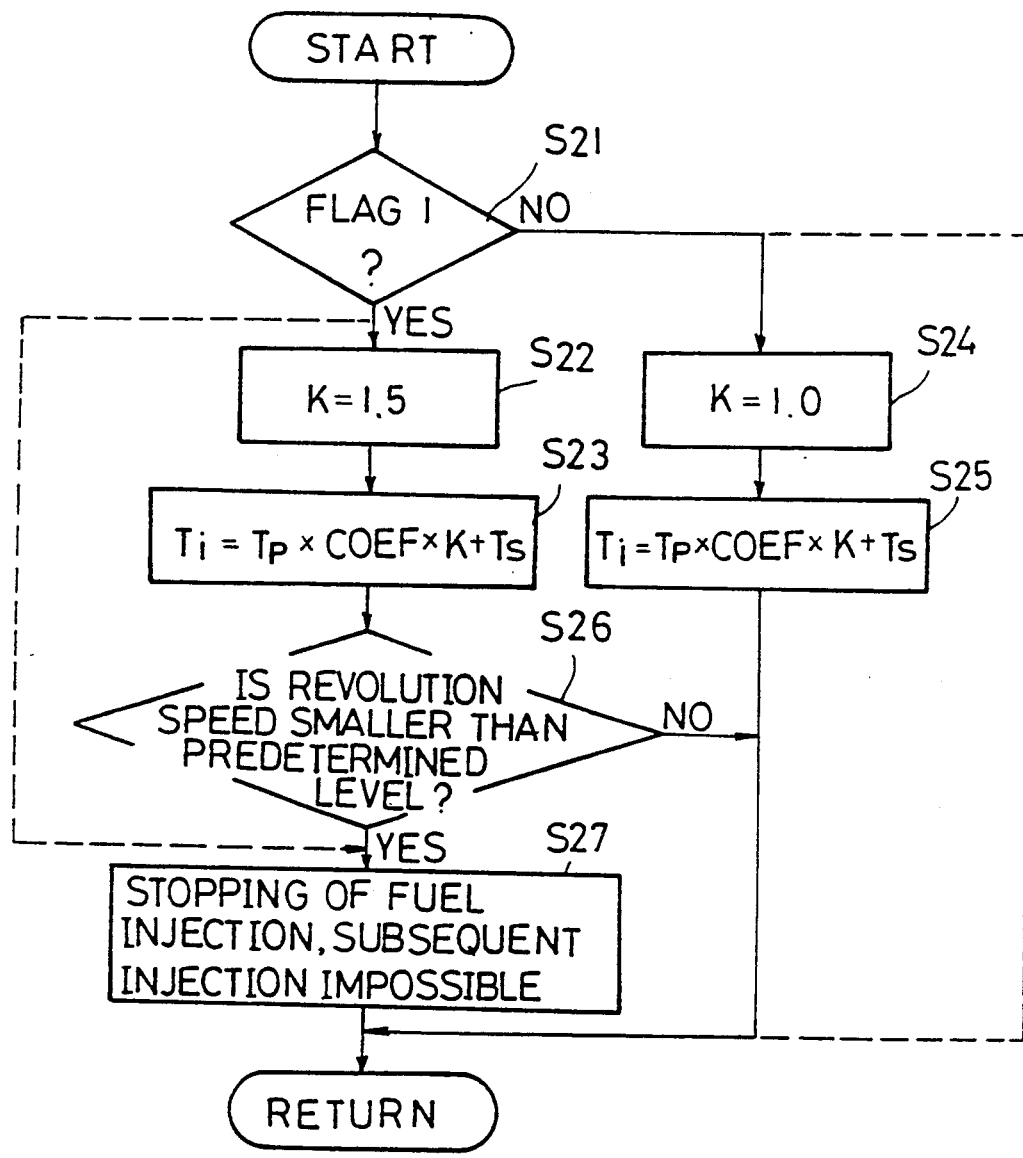

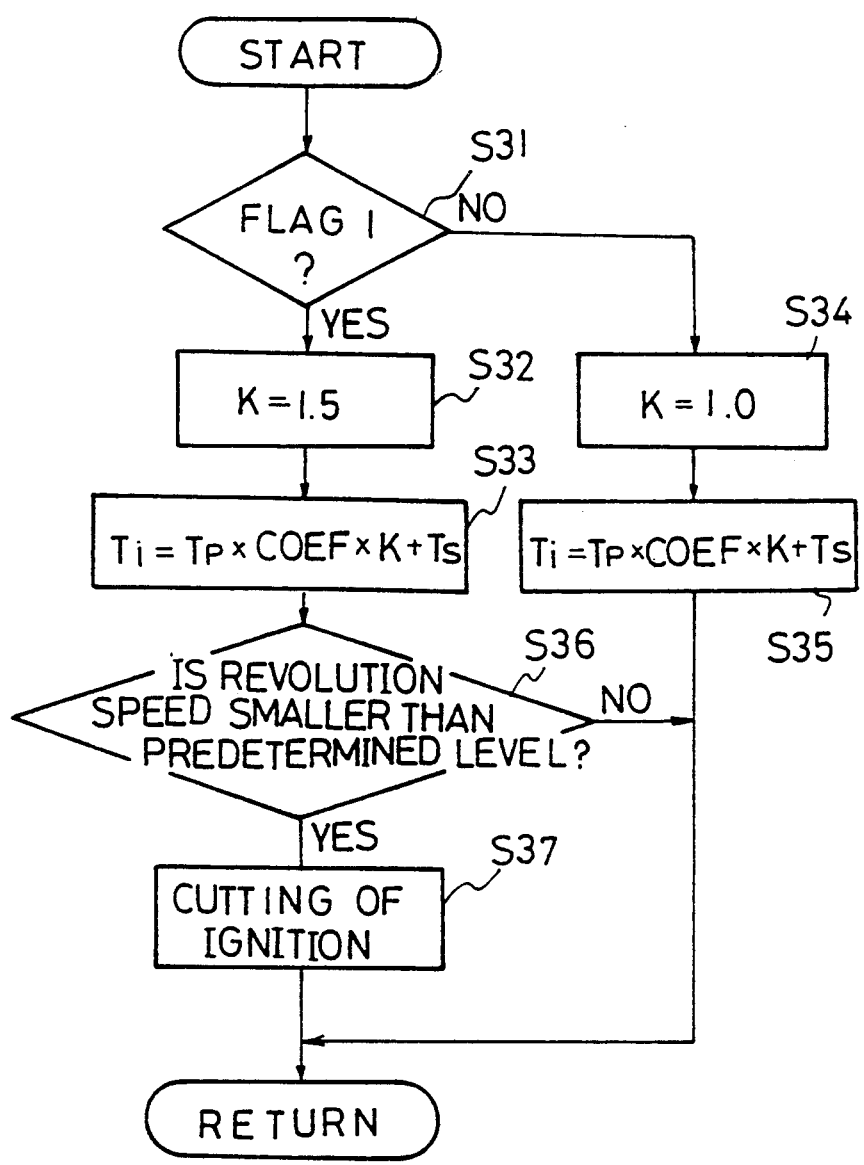

ENGINE PROTECTING SYSTEM

BACKGROUND OF THE INVENTION (1) Field of the Invention

The present invention relates to an engine protecting system. More particularly, the present invention relates to a system for protecting an engine in which the driving power is transmitted through a variable reduction gear ratio belt, wherein when the belt is broken, occurrence of an abnormal revolution such as an overrun is prevented to protect the engine.

(2) Description of the Related Art

In a two-cycle engine used for a two-wheeled vehicle or a snow mobile, the driving power is transmitted through a variable reduction gear ratio belt (CVT) (see, for example, REX Service Manual, June 1989, Fuji Heavy Industries Ltd.).

In this two-cycle engine, when the variable reduction gear ratio belt is broken, it is apprehended that an abnormal revolution of the engine, for example, an overrun of the engine per se, will be caused.

SUMMARY OF THE INVENTION

The present invention has been completed to overcome the above-mentioned disadvantage of the conventional technique, and it is a primary object of the present invention to protect an engine of the type where the driving power is transmitted through a variable reduction gear ratio belt, by preventing occurrence of an abnormal state such as an overrun of the engine by informing a driver assuredly of breaking of the belt.

Another object of the present invention is to protect an engine of the above-mentioned type by forcibly stopping the engine when the belt is broken.

Still another object of the present invention is to protect an engine of the above-mentioned type by controlling the revolution speed of the engine and simultaneously lowering the temperature in a combustion chamber on occurrence of breaking of the belt, and then, forcibly stopping the engine.

According to the present invention, the foregoing objects can be attained by a system for protecting an engine where the driving power is transmitted through a variable reduction gear ratio belt, which comprises, as shown in FIG. 1A, engine revolution speed-detecting means for detecting the revolution speed of the engine, belt breaking-judging means for judging, based on a detection value signal outputted from the engine revolution speed-detecting means, whether or not the variable reduction gear ratio belt is broken, and engine-stopping control means for performing the control of stopping the engine when it is judged by the judging means that the belt is broken.

The engine-stopping control means can be means for stopping injection of a fuel to the engine or means for stopping ignition of the engine.

Alternatively, there can be adopted means for stopping injection of an engine or ignition of the engine and then, rendering injection of a fuel or ignition of the engine impossible.

Since the engine is stopped by adopting the above structure on occurrence of breaking of the belt, an abnormal state such as an overrun of the engine can be prevented, and a driver can know occurrence of breaking of the belt and cope with this disorder.

According to the present invention, in the case where breaking of the belt takes place, if the quantity of a fuel supplied to the engine is increased to excessively enrich the air-fuel mixing ratio before the engine is forcibly stopped, increase of the revolution speed of the engine can be controlled and simultaneously, the temperature in the combustion chamber can be lowered by the fuel supplied in an increased amount.

More specifically, in accordance with another aspect of the present invention, there is provided a system for protecting an engine where the driving power is transmitted through a variable reduction gear ratio belt, which comprises, as shown in FIG. 1B, engine revolution speed-detecting means for detecting the revolution speed of the engine, belt breaking-judging means for judging, based on a detection value signal outputted from the engine revolution speed-detecting means, whether or not the variable reduction gear ratio belt is broken, air-fuel ratio-controlling means for performing the control of excessively enriching the air-fuel ratio in an air-fuel mixture supplied to the engine when it is judged by the judging means that the belt is broken, engine revolution speed-judging means for comparing a detection value signal outputted from the engine revolution speed-detecting means with a preliminarily set reference value signal of the revolution speed of the engine after execution of the control of excessively enriching the air-fuel ratio and judging whether or not the detection value is smaller than the reference value, and engine-stopping control means for performing the control of the stopping the engine when it is judged by the judging means that the detection value is smaller than the reference value.

If the above-mentioned structure is adopted, when breaking of the belt takes place, the air-fuel ratio in the air-fuel mixture supplied to the engine is first excessively enriched, and therefore, increase of the revolution speed of the engine is controlled and simultaneously, the temperature in the combustion chamber is lowered. By then forcibly stopping the engine, occurrence of an abnormal state such as an overrun of the engine can be prevented.

The present invention will now be described in detail with reference to embodiments illustrated in the accompanying drawings. However, the present invention is not limited by these embodiments and various modifications can be freely made within the scope defined in the claims.

BRIEF DESCRIPTION OF THE DRAWINGS

FIG. 6 is a flow chart showing the contents of the control concerning the fuel injection among the controls of the engine in one embodiment of the present invention.

FIG. 8 is a flow chart showing the contents of the control concerning the ignition among the controls of the engine in one embodiment of the present invention.

DETAILED DESCRIPTION OF THE PREFERRED EMBODIMENTS

Figure 1A:
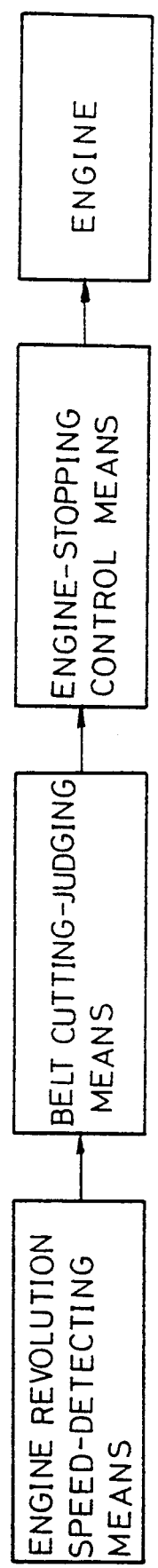
FIGS. 1A and 1B are functional block diagrams showing the structure of the present invention.
Figure 1B:
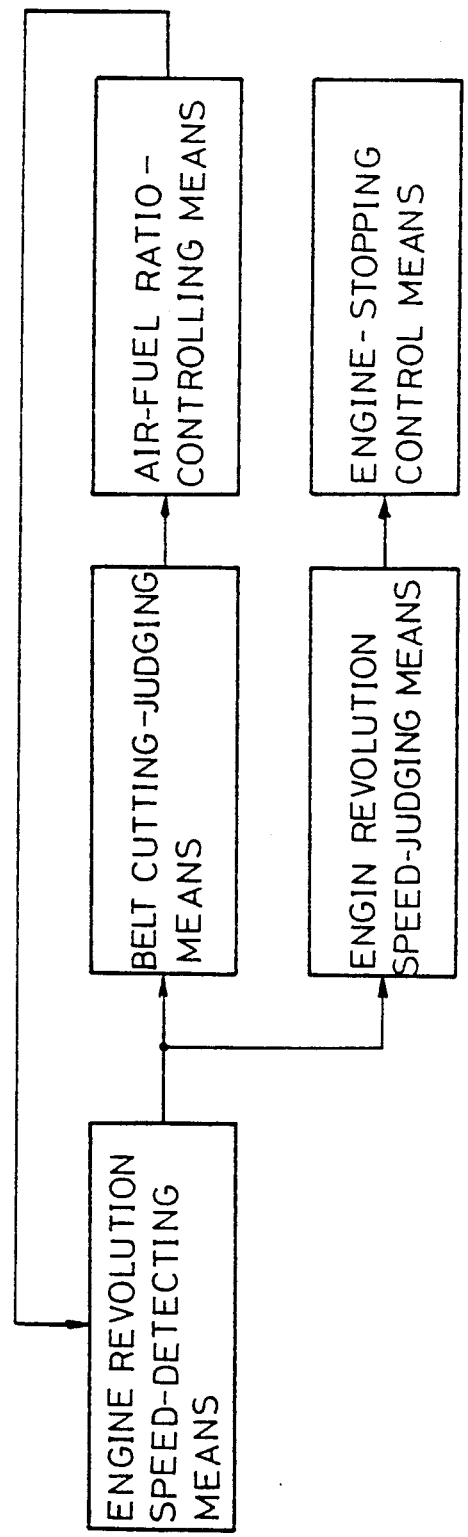
Figure 2:
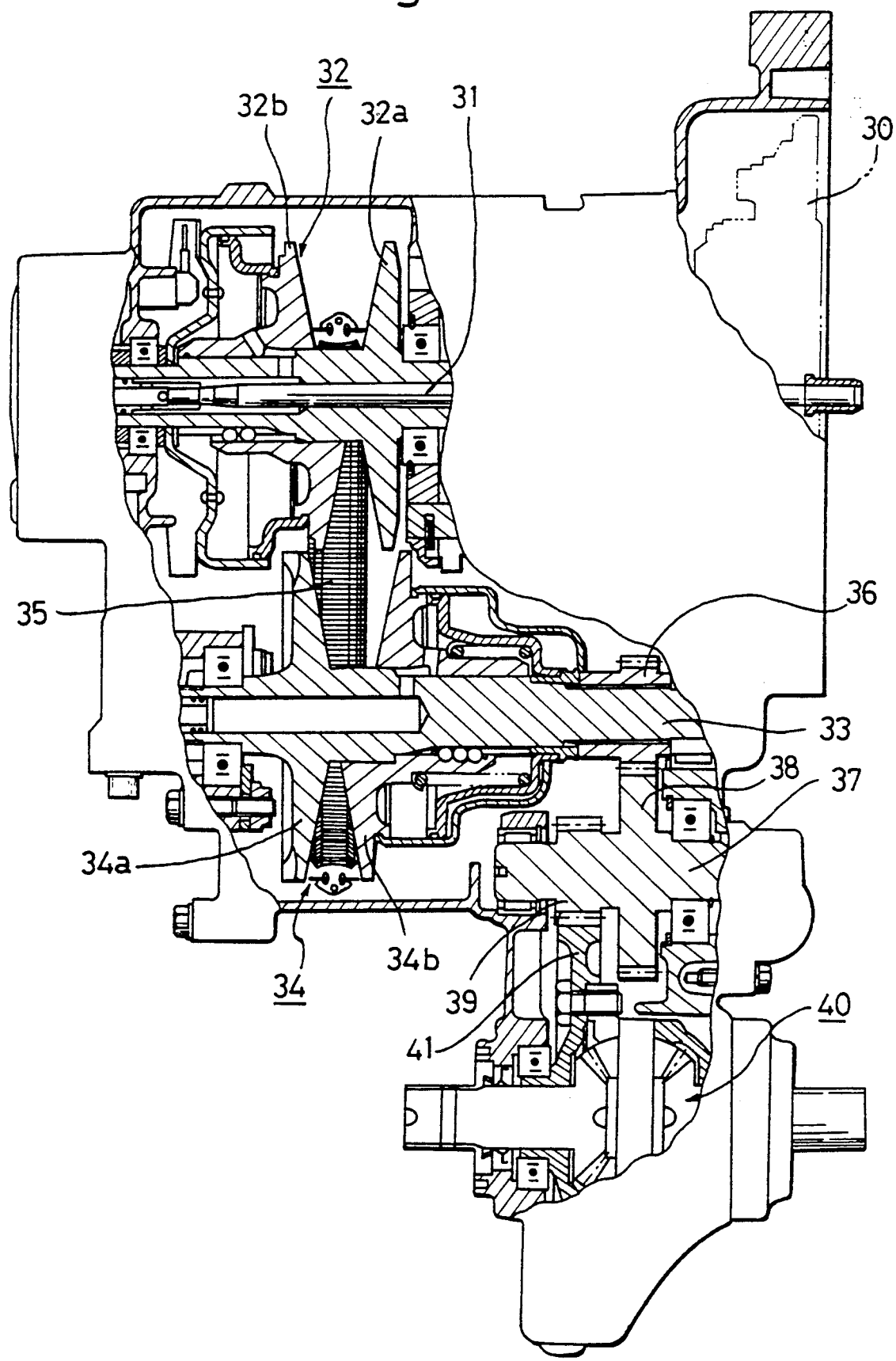
FIG. 2 is a sectional diagram illustrating the structure of a driving power transmission mechanism of an engine comprising a variable reduction gear ratio belt in one embodiment of the present invention.

FIG. 2 shows the structure of a driving power transmission mechanism of an engine comprising a variable reduction gear ratio belt. The driving power of the engine is transmitted to a driving shaft 31 through an electronically controlled electromagnetic clutch 30. A driving belt wheel 32 is arranged on the driving shaft 31, and the driving belt wheel 32 comprises a stationary pulley piece 32a and a movable pulley piece 32b. A driven belt wheel 34 is arranged on a driven shaft 33. This driven belt wheel 34 comprises a stationary pulley piece 34a and a movable pulley piece 34b.

A variable reduction gear ratio belt 35 is hung on the driving belt wheel 32 and the driven belt wheel 34.

A reduction gear 36 is mounted on the driven shaft 33 and this reduction gear 36 is engaged with a gear 38 arranged on a drive pinion shaft 37.

Another gear 39 arranged on the drive pinion shaft 37 is engaged with a final gear 41 of a differential 40.

The driving power of the engine transmitted to the driving shaft 31 is therefore transmitted to the driven shaft 33 from the driving shaft 31 through the variable reduction gear ratio belt 35 and is then transmitted to the differential 40 from the driven shaft 33 through the drive pinion shaft 37.

In the driving belt wheel 32, the movable pulley piece 32a is pressed and moved by a hydraulic pressure to change the groove width between the movable pulley piece 32a and the stationary pulley piece 32b. In the driven belt wheel 34, the movable pulley piece 34a is moved in a direction reverse to the moving direction of the movable pulley piece 32a to reversely change the groove width between the movable pulley piece 34a and the stationary pulley piece 34b.

Accordingly, by controlling the hydraulic pressure, pitch diameters of the driving belt wheel 32 and the driven belt wheel 34 are variably controlled and the revolution ratio between both the belt wheels 32 and 34 is variably controlled, whereby the speed is changed.

Figure 3:
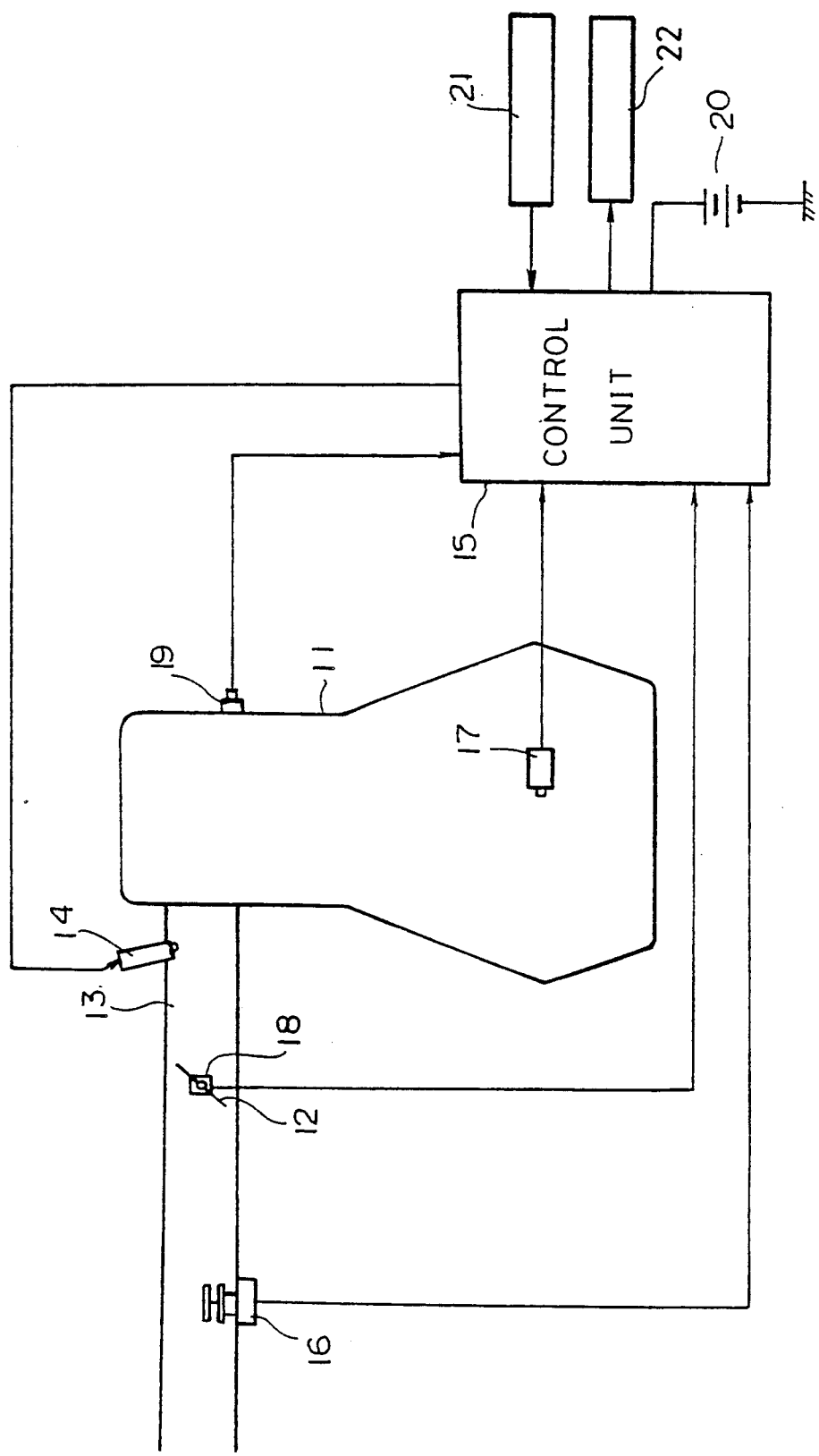
FIG. 3 is a system diagram illustrating one embodiment of the present invention.

FIG. 3 is a diagram illustrating a system for controlling a two-cycle engine of the electronically controlled fuel injection type in which the driving power is transmitted through the above-mentioned variable reduction gear ratio belt, as one embodiment of the engine of the present invention.

Air is sucked into this engine 11 through an intake manifold 13 from an air cleaner not shown in the drawings via a throttle valve 12 operating with an accelerator pedal. Fuel injection valves 14 for respective cylinders are arranged at a branch portion of the intake manifold 13. Each fuel injection valve 14 is an electromagnetic fuel injection valve which is opened by application of electricity to a solenoid and is closed by stopping of application of electricity to the solenoid. Namely, when the solenoid is actuated by a driving pulse signal from a control unit 15, the valve 14 is opened, and while the valve 14 is opened, a fuel fed under pressure from a fuel pump and having a pressure adjusted to a predetermined level by a pressure adjusted to a predetermined level by a pressure regulator is injected and supplied to the engine.

Output signals from various sensors are inputted into the control unit 15, and an operation of input data is performed by a microcomputer built in the control unit 15 to determine a fuel injection quantity (injection time) Ti and an injection timing and a driving pulse signal is outputted to the fuel injection valve 14 according to the determined fuel injection quantity and injection timing. The control unit 15 outputs an operation control signal to an igniting apparatus 22 to control the ignition timing. The above-mentioned microcomputer comprises a central processing unit, an input-output processing unit, a memory and the like.

These sensors include an air flow meter 16 for outputting a signal corresponding to an intake air flow quantity Q and an engine crank angle sensor 17 built in a distributor not shown in the drawings to output a reference signal at every 120°. The revolution speed of the engine can be detected by measuring the frequency of this reference signal.

A throttle sensor 18 of the potentiometer type is disposed in the throttle valve 12 to output a signal corresponding to the opening degree α of the throttle valve 12. Furthermore, a water temperature sensor 19 is arranged in a water jacket of the engine 11 to output a signal corresponding to a cooling water temperature Tw. A voltage of a battery 20 as the operation power source or for detection of a power source voltage VB is applied to the control unit 15.

Figure 4:
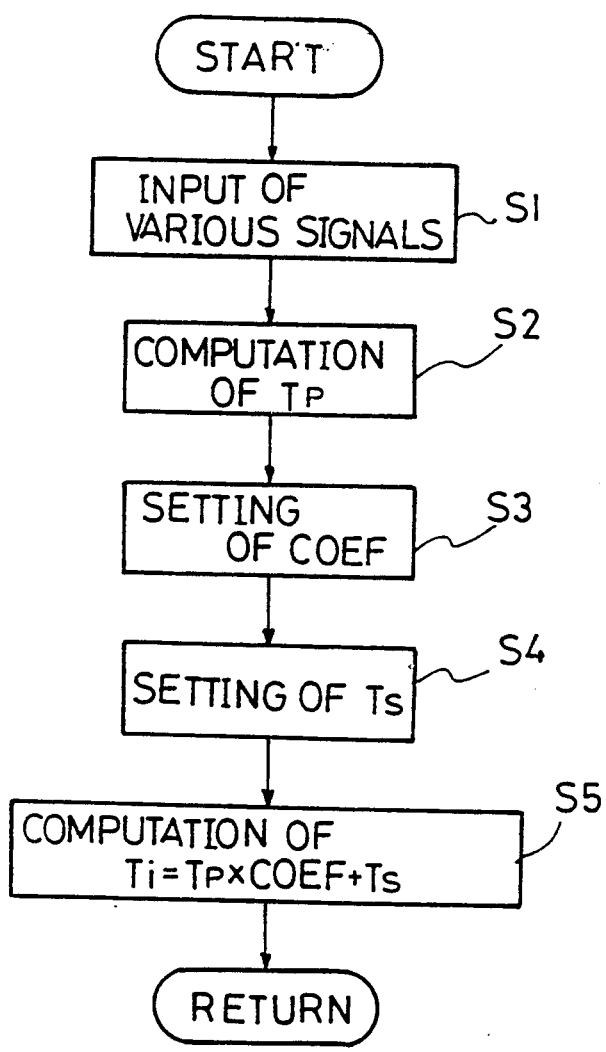
FIG. 4 is a flow chart showing the contents of the fuel injection control in one embodiment of the present invention.

The routine of setting the injection of the fuel by the microcomputer in the control unit 15 will now be described in detail with reference to the flow chart of FIG. 4.

At step 1 (referred to as "S1" in the drawings; subsequent steps are similarly indicated), informations of the driving state of the engine detected by the sensors are inputted in the microcomputer.

At step 2, the basic fuel injection quantity Tp ($=K \times Q/N$: K is a constant) is computed based on the sucked air flow quantity Q and the engine revolution number N.

At step 3, various correction coefficients COEF are set by the cooling water temperature Tw representing the engine temperature and the like.

At step 4, a voltage correction value Ts is set according to the voltage VB of the battery 20. This voltage correction value Ts is to correct the change of the effective opening time of the fuel injection valve 14 caused by the change of the battery voltage VB.

At step 5, the actual fuel injection quantity is computed from obtained Tp, COEF and Ts according to the following equation:

$$Ti = Tp \times COEF + Ts$$

In the control unit 15, there are disposed belt breaking-judging means for judging whether or not the variable reduction gear ratio belt is broken, based on an engine revolution speed detection value signal outputted from the crank angle sensor 17 as the engine revolution speed-detecting means, air-fuel ratio-controlling means for excessively enriching the air-fuel ratio of an air-fuel mixture supplied to the engine when it is judged by the judging means that the belt is broken, engine revolution speed-judging means for comparing the engine revolution detection value signal outputted from the crank angle sensor 17 with a preliminarily set reference value signal of the engine revolution speed after the execution of the control of excessively enriching the air-fuel ratio and judging whether or not the detection value is smaller than the reference value, and engine-stopping control means for performing the control of stopping the engine when it is judged by the judging means that the detection value is smaller than the reference value.

The above-mentioned belt breaking-judging means compares the engine revolution speed detection value signal outputted from the crank angle sensor 17 with the preliminarily set reference value signal of the engine revolution speed and judges breaking of the belt when the detection value is larger than the reference value during a predetermined time.

Figure 5:
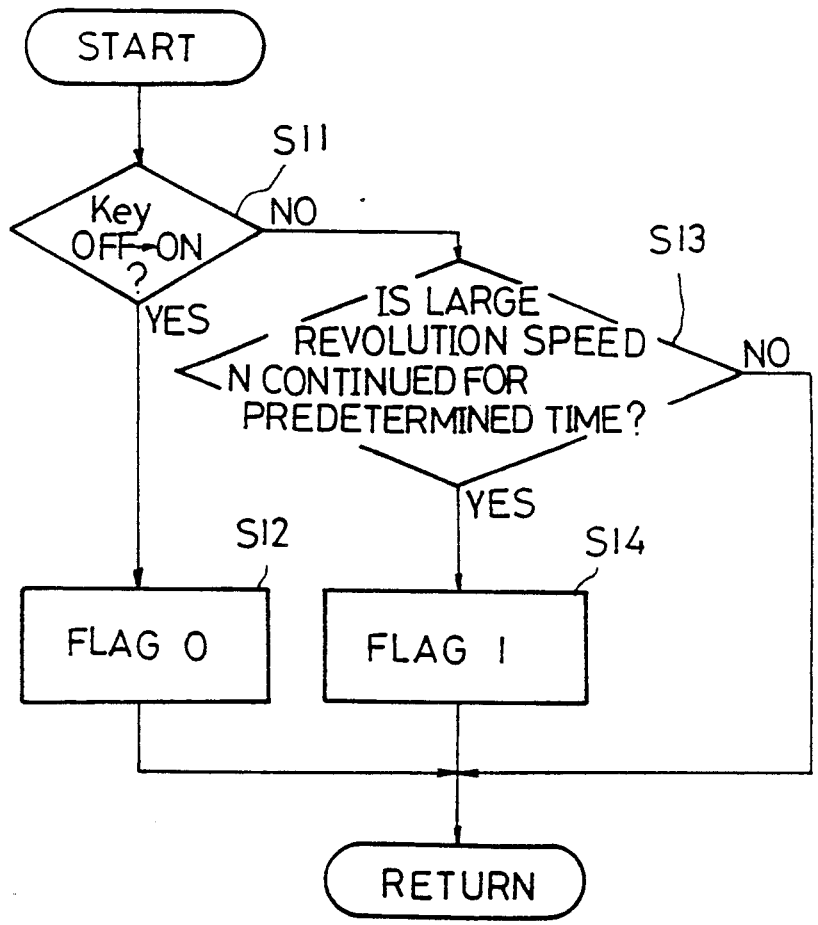
FIG. 5 is a flow chart showing the contents of the judgement of breaking of the belt in one embodiment of the present invention.

Incidentally, step 13 shown in FIG. 5 corresponds to the belt breaking-judging means, and in FIG. 6, steps 22 and 23 correspond to the air-fuel ratio-controlling means, step 26 corresponds to the engine rotation speed-judging means and step 27 corresponds to the engine-stopping control means.

The operation of the foregoing means will now be described with reference to flow charts of FIGS. 5 and 6.

The flow chart of FIG. 5 shows the routine of judging breaking of the belt. At step 11, it is judged whether or not the time is just after the change of the state of a signal outputted from an engine key switch 21 from the off-state to the on-state. If it is judged that the time is just after the change of the state from the off-state to the on-state, the routine goes into step 12 and a flag is set at 0. If it is judged that the time is not just after the change of the state from the off-state to the on-state, the routine goes into step 13 and it is judged whether or not the state of a large engine revolution speed N (for example, larger than 10000 r.p.m. as the standard value) is continued for a time longer than a predetermined time (for example, 1 second). If it is judged that the state of a large engine revolution speed N is continued for a time longer than the predetermined time, it is judged that the belt is broken, and the routine goes into step 14 and the flag is set at 1. If breaking of the belt is not judged, the routine returns.

The flow chart of FIG. 6 shows a routine of controlling the engine based on the result of the judgement of breaking of the belt. At step 21, it is judged whether or not the flag in the flow chart of FIG. 5 is set at 1 (the belt is broken), and if it is judged that the flag is set at 1, the routine goes into step 22 and a fuel injection quantity increase value K, described hereinafter, for excessively enriching the air-fuel ratio, is set, for example, at 1.5. The routine goes into step 23. If it is judged that the flag is not set at 1, the routine goes into step 24 and the fuel injection quantity increase value K is set at 1, and the routine goes into step 25.

At step 24, the fuel injection quantity is computed according to the following equation formed by adding the fuel injection quantity increase value K to the above equation for the computation of the injection quantity:

$$Ti = Tp \times COEF \times K + Ts$$

Thus, the fuel injection quantity is increased over the normal fuel injection quantity, whereby the air-fuel ratio is excessively enriched.

At step 25, although the fuel injection quantity is computed according to the above equation, since K is 1, the fuel injection quantity is not increased and the normal fuel injection quantity is obtained by the computation, and the routine returns.

At step 26, it is judged whether or not the revolution speed N is smaller than the reference value (for example, 4000 r.p.m.) of the engine revolution speed, and if it is judged that the revolution speed N is smaller than the reference value, the routine goes into step 27 where the control of stopping the injection of the fuel and rendering the subsequent injection impossible is performed. If it is judged that the revolution speed N is not smaller than the reference value, the routine returns.

Namely, if the control of excessively enriching the air-fuel ratio is performed at step 24 and the engine revolution speed is reduced to the reference value, that is, the speed at which the engine is thermally stable, the control of stopping the engine is performed at step 27 while rendering the subsequent injection of the fuel impossible.

By adopting the above structure, even if an abnormal revolution of the engine, such as an overrun of the engine, is caused by breaking of the belt, the air-fuel ratio is excessively enriched to reduce the revolution speed of the engine, and simultaneously, the temperature in the combustion chamber can be lowered by the excessively injected fuel. Moreover, if the injection of the fuel is stopped at the point when the engine revolution speed is reduced to a safe level and the subsequent fuel injection is rendered impossible, the engine can be protected. Moreover, a driver can be informed of breaking of the belt by the above control operations.

Figure 7:
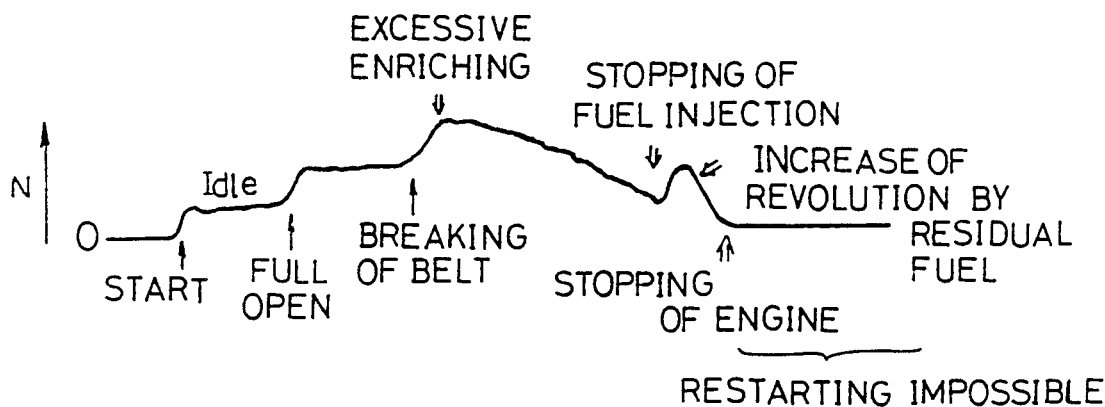
FIG. 7 is a time chart showing the change of the revolution state of the engine from the point of the start of the engine to the point of the termination of the control of the present invention in one embodiment of the present invention.

FIG. 7 is a time chart showing the change of the engine revolution state from the point of the start of the engine to the point of the termination of the above-mentioned control.

In the foregoing embodiment, if an overrun of the engine is caused by breaking of the belt, the control of excessively enriching the air-fuel ratio, the control of stopping the fuel injection and the control of rendering the fuel injection impossible are performed. However, in the present invention, an overrun of the engine by breaking of the belt can be sufficiently coped with only by performing the control of stopping the engine, for example, by stopping the fuel injection.

The contents of this control is shown by a flow indicated by dotted lines in the flow chart of FIG. 6, in which the routine goes directly into step 26 from step 21 while skipping steps 22, 23, 24 and 25.

Furthermore, means for cutting the ignition can be adopted as the engine-stopping control means.

The contents of this control of cutting the ignition are shown in the flow chart of FIG. 8.

In this flow charts, steps 31 through 36 are the same as in the flow chart of FIG. 6, and the control of cutting the ignition is performed at step 37.

We claim:

1. A system for protecting an engine where the driving power is transmitted through a variable reduction gear ratio belt, which comprises engine revolution speed-detecting means for detecting the revolution speed of the engine, belt breaking-judging means for judging, based on a detection value signal outputted from the engine revolution speed-detecting means, whether or not the variable reduction gear ratio belt is broken, and engine-stopping control means for performing the control of stopping the engine when it is judged by the judging means that the belt is broken.

2. An engine protecting system as set forth in claim 1, wherein the belt breaking-judging means is means for comparing a detection value signal outputted from the engine revolution speed-detecting means with a preliminarily set reference value signal of the revolution speed of the engine and judging breaking of the belt if the detection value is larger than the reference value for a predetermined time.

3. An engine protecting system as set forth in claim 1, wherein the engine-stopping control means is means for stopping the injection of a fuel.

4. An engine protecting system as set forth in claim 1, wherein the engine-stopping control means is means for stopping the ignition of the engine.

5. An engine protecting system as set forth in claim 1, wherein the engine-stopping control means is means for stopping the injection of a fuel or the ignition of the engine and rendering subsequent fuel injection or ignition impossible.

6. A system for protecting an engine where the driving power is transmitted through a variable reduction gear ratio belt, which comprises engine revolution speed-detecting means for detecting the revolution speed of the engine, belt breaking-judging means for judging, based on a detection value signal outputted from the engine revolution speed-detecting means, whether or not the variable reduction gear ratio belt is broken, air-fuel ratio-controlling means for performing the control of excessively enriching the air-fuel ratio in an air-fuel mixture supplied to the engine when it is judged by the judging means that the belt is broken, engine revolution speed-judging means for comparing a detection value signal outputted from the engine revolution speed-detecting means with a preliminarily set reference value signal of the revolution speed of the engine after execution of the control of excessively enriching the air-fuel ratio and judging whether or not the detection value is smaller than the reference value, and engine-stopping control means for performing the control of the stopping the engine when it is judged by the judging means that the detection value is smaller than the reference value.

7. An engine protecting system as set forth in claim 6, wherein the belt breaking-judging means is means for comparing a detection value signal outputted from the engine revolution speed-detecting means with a preliminarily set reference value signal of the revolution speed of the engine and judging breaking of the belt if the detection value is larger than the reference value for a predetermined time.

8. An engine protecting system as set forth in claim 6, wherein the engine-stopping control means is means for stopping the injection of a fuel.

9. An engine protecting system as set forth in claim 6, wherein the engine-stopping control means is means for stopping the ignition of the engine.

10. An engine protecting system as set forth in claim 6, wherein the engine-stopping control means is means for stopping the injection of a fuel or the ignition of the engine and rendering subsequent fuel injection or ignition impossible.

11. An engine protecting system as set forth in claim 6, wherein the air-fuel ratio-controlling means is means for increasing the fuel injection quantity Ti according to the following equation:

$$Ti = Tp \times COEF \times K + Ts$$

wherein Tp represents the basic fuel injection quantity, COEF represents various correction coefficients, K represents an increase value of the fuel injection quantity, and Ts represents a correction value of the battery voltage.

* * * * *